March 11, 1958  H. C. WYNNE  2,826,005
APPARATUS FOR MANUFACTURING FLAT GLASS IN RIBBON FORM
Filed Sept. 30, 1954  2 Sheets-Sheet 1
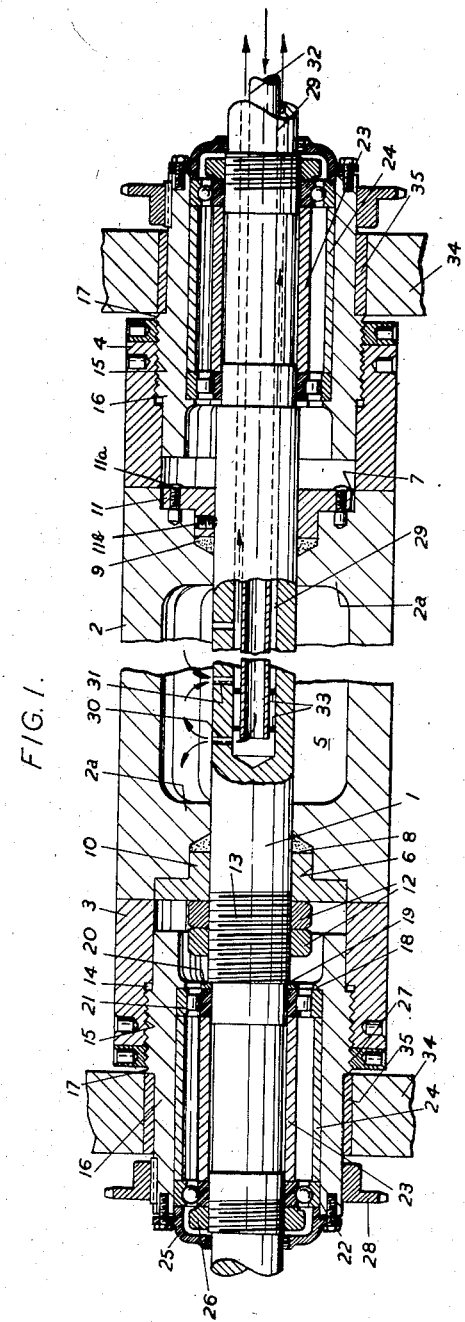
Inventor
H. C. Wynne
By
Attorneys

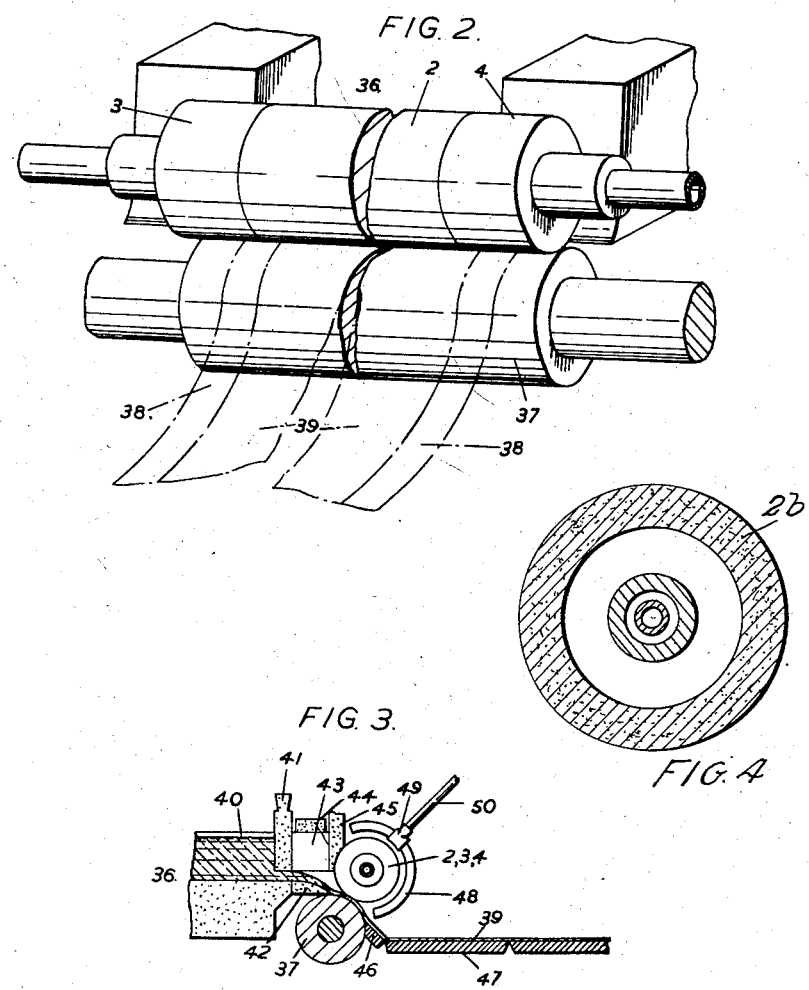

United States Patent Office 2,826,005
Patented Mar. 11, 1958

2,826,005

APPARATUS FOR MANUFACTURING FLAT GLASS IN RIBBON FORM

Hubert C. Wynne, Barnby Dun, near Doncaster, England, assignor to Pilkington Brothers Limited, Liverpool, England, a company of Great Britain Application September 30, 1954, Serial No. 459,418

Claims priority, application Great Britain October 6, 1953

6 Claims. (Cl. 49—33)

This invention relates to the manufacture of flat glass in ribbon form.

In the manufacture of flat glass in ribbon form, a usual practice is to flow the molten metal from the spout of a tank furnace, in which the glass batch is melted, between casting rollers which are driven at a slow peripheral speed which is substantially the same as the speed of the ribbon of glass which emerges from the rollers. These rollers extend across the width of the ribbon and as the ribbon passes between them squash it to the desired thickness. The rollers are mounted for mutual adjustment to regulate the distance between their peripheries, which distance determines the thickness of the ribbon. This operation is sometimes referred to as sizing.

During the operation of sizing the ribbon by the rollers, the latter, being continually in direct contact with the ribbon, take up heat from the glass, which heat transfer to the slowly revolving rollers has a tendency to engender warping.

Many water cooling systems have been devised to rapidly dissipate heat transferred to the rollers, but unless the local heating in the rollers is rapidly dissipated local unequal temperatures occur in the roller wall and distortion of the rollers follows. Further, the rollers may have imperfections in the metal from which the walls are made, which imperfections lead to inequalities in heat conduction through the wall of the roller; moreover, unequal depositing of scale from the cooling water flowing within the rollers leads to unequal cooling. Any deformation in the rollers produces irregularity in the flatness of the glass which irregularity produces undesirable optical effects when viewing through the glass.

In addition to the troubles with the rollers already mentioned there arises also the damage to the surface finish of the rollers which is due to the high temperature molten glass being constantly in contact with the rollers, which glass erodes the rollers. When the surface finish is thus impaired the ribbon of glass leaving the rollers is impaired. When the surface finish of the rollers is impaired or an uncorrected deformation persists the latter have to be replaced. The replacement of either roller involves cutting off the outflow from the tank and a consequential interruption in production.

The main object of the present invention is to provide improved means of minimising interruption of production by sizing the ribbon of glass whilst reducing the conduction of heat to the sizing means and at the same time achieving a regular progressive movement of the glass through the sizing means.

The present invention comprises apparatus for manufacturing a sized ribbon of glass characterised by compressing and effecting a heat exchange with the marginal portions only of the ribbon, applying a tractive force to said marginal portions so that the ribbon is positively advanced lengthwise as it is formed, and progressively subjecting the intermediate body portion of the ribbon to a compressive force directed through a heat insulating gaseous layer whereby the thickness desired for the said body portion of the ribbon is obtained and a fire polished condition obtained thereon.

The invention also comprehends apparatus for manufacturing a sized ribbon of glass, which comprises in combination with a casting roller of normal design arranged below the spout of a glass furnace, coaxial driving rolls juxtaposed to the spout and disposed with respect to the casting roller so as to engage and compress the marginal portions only of the ribbon of glass formed on the casting roller and draw forward the ribbon, a spinning roller of a length to overlie the full width of the intermediate body portion of the ribbon adjacent to the driving rolls and means for producing a gaseous layer on the periphery between the roller and the ribbon, whereby as the ribbon is being sized the layer acts as a heat insulating medium between the glass and the roller. By such method of manufacture heat transfer to the roller is obstructed by the presence of the heat insulating gaseous layer.

In one practical embodiment of the invention the spinning roller is mounted coaxially with the driving rolls, the spinning roller spanning the space between the driving rolls. In such form of construction in accordance with the invention, the apparatus may be characterised by the employment of a hollow spinning roller formed of permeable metal or refractory material, e. g. graphite, and having end walls, said roller being mounted on a shaft passing through the end walls of the hollow roller and freely carrying the driving rolls, said shaft being hollow from one end thereof to the middle of the spinning roller, the shaft having radial openings one to each side of the central transverse plane of the roller, a tube located coaxially within the hollow part of the shaft and supported therein in spaced relation with the shaft by obturating means disposed between the radial openings, so that a cooling fluid supplied to the tube passes out thereof at the inner end beyond the obturating means, and flows through the adjacent opening into the interior of the spinning roller and then flows therefrom through the other radial opening into the annular space between the hollow part of the shaft and the tube, and means connecting the tube to supply and the hollow part of the shaft to a discharge pipe.

The heat insulating gaseous layer which is interposed between the body portion of the ribbon and the spinning roller may be produced by introducing an inert gas into the interior of the roller under such conditions that the gas will percolate through the wall of the spinning roller as the latter rotates. Alternatively, the roller is driven at a high speed so that a clinging film of air is generated on the surface of the roller.

It is known that a roller having a porous graphite wall produces a clinging film of air upon its surface if the latter is rotated so that the linear speed of the surface of the roller is about three thousand inches per minute. It is believed that speeds varying between two and four thousand inches per minute are good average speeds for obtaining the clinging film. Such a roller is hereinafter referred to as a spinning roller.

In order that the invention may be more clearly understood, one preferred embodiment thereof will now be described, by way of example, with reference to the accompanying diagrammatic drawings in which:

Fig. 1 is a sectional elevation through a composite sizing roller constructed according to one embodiment of the invention, Fig. 2 is a diagrammatic perspective view of an apparatus, including a composite sizing roller according to the invention, for manufacturing a sized ribbon of glass, Fig. 3 is a sectional elevation of the apparatus shown diagrammatically in Fig. 2, showing details omitted from Fig. 2 for the sake of clarity, and Fig. 4 is a cross-section of the sizing roller constructed according to another embodiment of the invention.

In the drawings like references designate the same parts. Referring to the drawings:

The composite roller is mounted on a central driving shaft 1 and consists of a hollow spinning roller 2 and driving rolls 3 and 4 shown in the drawing respectively at the left and right-hand ends of the spinning roller 2 and forming a continuous surface therewith. The hollow roller 2 includes end walls 2a which are axially bored to receive the shaft 1, a cooling fluid being supplied to the interior 5 of the roller as will be described hereinafter.

The bores in the end walls 2a of the spinning roller 2 are each enlarged to form similar stepped openings 6 and 7 in the inner ends of which packings 8 and 9 are respectively secured by glands 10 and 11. The gland 10 is pressed against the roller 2 and against the packing 8 by means of nuts 12 which are screwed on to a correspondingly threaded portion 13 of the driving shaft 1, and the gland 11 is fixed to the roller 2 by studs 11a and secured to the driving shaft 1 by a grub screw 11b, whereby drive is transmitted from the shaft 1 to the roller 2.

The driving roll 3, mounted with its inner end adjacent the left-hand end of the roller 2, is formed with an axial bore the outer end of which is of enlarged diameter to form a shoulder 14 and is internally threaded at 15. Mounted within the roll 3 is a sleeve 16 formed intermediate its ends with an externally threaded portion 17 which engages with the thread 15 in the roll 3. The inner end of the sleeve 16 is of reduced diameter to fit within the inner end of the roll 3 and is also formed with an internal flange 18.

The end of the driving shaft 1 extending beyond the threaded portion 13 thereof is reduced in diameter to form a shoulder 19 against which abuts a collar 20 mounted on the reduced end of the shaft. The collar 20 and the flange 18 form an abutment for a bearing, indicated diagrammatically at 21, e. g. a roller bearing mounted on the shaft 1 with the inner member abutting the collar 20 and the outer member abutting the flange 18.

Also mounted on the shaft 1 and within the sleeve 16 is a ball bearing indicated diagrammatically at 22 the inner and outer members of which are axially spaced from those of the bearing 21 by spacing liners 23 and 24 respectively, the liner 23 being mounted on the shaft 1 and the liner 24 within the sleeve 16.

The outer end of the sleeve 16 has secured thereto a retaining member 25 for the outer race of the bearing 22, the inner race being engaged by ring 26 in threaded engagement with the shaft 1.

It will be seen that relative rotation between the interengaging threaded portions of the roll 3 and sleeve 16 may be used to effect axial movement of the roll 3 towards or away from the spinning roller 2 into the desired position. The roll 3 may then be axially secured by means of a lock nut 27 tightened up on the externally threaded portion of the sleeve 16 against the outer end of the roll 3.

The composite roller is mounted in the usual side frames of the apparatus indicated at 34, the sleeves 16 being journalled in bearings 35 mounted in the said side frames 34.

Secured on the outer end of the sleeve 16 is a chain wheel 28 whereby the sleeve 16 and roll 3 may be driven at the speed of movement of the glass ribbon independently of the speed of rotation of the driving shaft 1.

The roll 4 is mounted on the other end of the shaft 1 in the same manner as the roll 3 and the parts associated with the roll 4 and the corresponding parts on roll 4 are indicated on the drawings by similar reference numerals.

For cooling the spinning roller 2 the right hand end of the shaft 1 as seen in the drawing is hollow, being formed with an axial bore 29 which terminates at a point substantially half way along the axis of the roller 2. The shaft 1 is also formed near the inner end of the bore 29 with two axially spaced radial bores 30, 31 which each provide communication between the interior of the roller and the bore 29. Mounted coaxially within the bore 29 of the shaft 1 is a tube 32 the outer end of which is connected to a supply of cooling fluid, usually water. The inner end of the tube 32 terminates near the end of the bore 29 and is secured coaxially therein by obturating rings 33 located in the annular space between the end of the tube 32 and the part of the bore 29 lying between the radial bores 30 and 31 so that there is communication between the interior 5 of the roller and the tube 32 through radial bore 30 and between the interior 5 and the axial bore 29 through the radial bore 31. The slight asymmetry of the cooling system is not of importance as the heat transfer is reduced compared with ordinary systems of rolling.

The lock nuts 27 and the sleeves 16 must be threaded so that rotation of the driving rolls 3 and 4 does not cause the lock nuts to be slackened. Thus one sleeve and lock nut will be a left-hand thread and the sleeve and lock nut at the other end of the shaft 1 a right-hand threaded.

The shaft 1 is arranged to be driven through suitable gearing (not shown) at a speed such that the linear speed of any part of the periphery of the spinning roller 2 is between 2,000 and 4,000 inches per minute. The rolls 3 and 4 are driven by a chain drive to the chain wheels 28, at the speed required to effect the desired rate of travel of the ribbon of glass, the driving rolls 3 and 4 and their associated sleeves 16 rotating freely on the bearings 21 and 22 relatively to the driving shaft 1.

Fluid is supplied to the interior 5 in the spinning roller 2 through the tube 32, connected in any convenient manner to a suitable fluid supply, and passes from the inner end of the tube through radial bore 30 and into the interior 5 and then leaves the interior 5 through the radial bore 31, passing into the annular space between the tube 32 and the axial bore 29 in the driving shaft 1. In this way a continuous circulation of fluid can be maintained in the interior 5 in order to effect cooling of the spinning roller 2, or a supply of inert gas under pressure may be effected through the tube 32 to the interior of a permeable roller 26 to produce an externally clinging film, as shown in the embodiment of Figure 4.

Figure 2 of the drawings shows diagrammatically the arrangement of the composite sizing roller in an apparatus for manufacturing a sized ribbon of glass. The spout of a glass furnace is indicated at 36 and a casting roller 37 is arranged below the spout so as to receive the glass issuing therefrom. The coaxial driving rolls 3 and 4 and the spinning roller 2 are juxtaposed to the spout and disposed above the casting roller and spaced therefrom so that the driving rolls 3 and 4 engage and compress the marginal portions 38 only of a ribbon of glass 39 formed on the casting roller and drive forward the said ribbon. The spinning roller 2 overlies the full width of the ribbon 39 intermediate the marginal portions 38, and because of its high speed of rotation a gaseous layer is maintained on the periphery of the spinning roller preventing contact of the latter with the glass and thereby minimising the transference of heat from the glass to the spinning roller, so that the ribbon is sized with a fire finish on the upper surface thereof.

Fig. 3 shows the disposition of the composite roller 2, 3, 4 in relation to the casting roller 37 and a glass melting tank 40. The tank 40 has a regulating tweel 41, and a spout 36, comprising a floor or lip 42 and side jambs 43. The side jambs and lip form a spout of a generally rectangular cross section and of a width substantially equal to that of the ribbon 39, and a cover 44 is secured in known manner over the floor of the spout. A gate 45 is adjustably suspended by means not shown in a vertical plane.

A sloping plane member 46 and horizontal members 47 support the sized fire finished ribbon 39 coming from the composite roller 2, 3, 4 and the casting roller 37.

It will be understood that instead of the arrangement shown in Figure 2 both the upper and lower rollers could be composite rollers constructed as described in Figure 1 of the drawings in which case a fire finish could be obtained on both surfaces simultaneously.

As diagrammatically indicated in Figure 3 of the drawings, each driving roll 3, 4 is provided with air cooling means comprising an arcuate pipe 48 disposed concentrically with the rolls 3, 4, the inner profile of the pipe being perforated and the middle of the pipe being connected by a union 49 to a pipe 50 connected to a suitable source of air under pressure, so that there is continually applied to the rim of each roll 3, 4 a cooling stream of air.

By the present invention interruption of production due to correcting distortions of sizing rollers is substantially eliminated and loss of heat from the glass by conduction to sizing rollers is greatly reduced whilst the regular progression of the glass through the sizing means is achieved.

What I claim is:

1. Apparatus for manufacturing a sized ribbon of glass comprising in combination with a casting roller arranged below the spout of a glass furnace, coaxial rolls juxtaposed to the spout and means for driving the rolls, the driven rolls being disposed with respect to the casting roller so as to engage and compress between them the marginal portions only of the ribbon of glass formed on the casting roller and draw forward the ribbon, a spinning roller of a length to overlie the full width of the intermediate body portion of the ribbon on the casting roller and driving means for rotating said spinning roller for producing a gaseous layer on the periphery between the roller and the ribbon, whereby as the ribbon is being sized the gaseous layer acts as a heat insulating medium between the glass and the spinning roller.

2. Apparatus according to claim 1 wherein each said driven roll is provided with external cooling means comprising an arcuate pipe closed at least at one end and extending over the periphery of the rim of the roll and in spaced relation therewith, said pipe being perforated on the inner profile and a connection between the said pipe and a source of cooling fluid whereby the cooling medium is directed out of the perforated arcuate pipe on to the rim of the respective driven roll.

3. Apparatus for manufacturing a sized ribbon of glass comprising in combination with a casting roller arranged below the spout of a glass furnace, coaxial rolls juxtaposed to the spout and means for driving the rolls, the driven rolls being disposed with respect to the casting roller so as to engage and compress between them the marginal portions only of the ribbon of glass formed on the casting roller and draw forward the ribbon, a spinning roller of a length to overlie the full width of the intermediate body portion of the ribbon on the casting roller, said spinning roller being coaxial with the driven rolls, the spinning roller spanning the space between the driven rolls and driving means for rotating said spinning roller for producing a gaseous layer on the periphery between the roller and the ribbon, whereby as the ribbon is being sized the gaseous layer acts as a heat insulating medium between the glass and the spinning roller.

4. Apparatus according to claim 3 characterized by a hollow spinning roller, end walls for said spinning roller, a driving shaft for said spinning roller, said shaft passing through the end walls of the hollow roller, said shaft freely carrying the driven rolls, said shaft being hollow from one end thereof to the middle of the spinning roller, the shaft having radial openings one to each side of the central transverse plane of the roller, a tube located coaxially within the hollow part of the shaft and supported therein in spaced relation with the shaft by obturating means disposed between the radial openings, so that a cooling fluid supplied to the tube passes out thereof at the inner end beyond the obturating means, and flows through the adjacent radial opening into the interior of the spinning roller and then flows therefrom through the other radial opening into the annular space between the hollow part of the shaft and the tube, and means connecting the tube to supply and the hollow part of the shaft to a discharge pipe.

5. Apparatus according to claim 3, characterized by a hollow spinning roller formed of permeable material, end walls for said spinning roller, a driving shaft for said spinning roller, the shaft passing through the end walls of the hollow roller, said shaft freely carrying the driven rolls, said shaft being hollow from one end thereof to the middle of the spinning roller, the shaft having radial openings one to each side of the central transverse plane of the roller, a tube located coaxially within the hollow part of the shaft and supported therein in spaced relation with the shaft by obturating means disposed between the radial openings, so that an inert gas under pressure supplied to the tube passes out thereof at the inner end beyond the obturating means, and flows through the adjacent radial opening to fill the interior of the spinning roller and percolate through the permeable wall thereof and flows from the interior through the other radial opening into the annular space between the hollow part of the shaft and the tube, and means connecting the tube to supply and the hollow part of the shaft to a discharge pipe.

6. Apparatus for manufacturing a sized ribbon of glass comprising a pair of sizing rollers each sizing roller including a hollow spinning roller and a roll at each end of each spinning roller coaxial with the respective spinning roller, the rolls at each end of the sizing rolls being disposed to engage and compress between them the marginal portions only of the ribbon of glass being formed and each hollow spinning roller spanning the space between the respective end rolls, means for synchronously driving the said end rolls whereby the ribbon is advanced between the spinning rolls, end walls for each hollow spinning roller, a driving shaft for each said spinning roller, each said driving shaft passing through the end walls of the respective hollow roller, said shaft freely carrying the associated end rolls, each said shaft being hollow from one end therof to the middle of the spinning roller, the shaft having radial openings one to each side of the central transverse plane of the roller, a tube located coaxially within the hollow part of the shaft and supported therein in spaced relation with the shaft by obturating means disposed between the radial openings, so that a cooling fluid supplied to the tube passes out thereof at the inner end beyond the obturating means, and flows through the adjacent radial opening into the interior of the respective spinning roller and then flows therefrom through the other radial opening into the annular space between the hollow part of the shaft and the tube, and means connecting the tube to supply and the hollow part of the shaft to a discharge pipe.

References Cited in the file of this patent

UNITED STATES PATENTS

| 1,435,958 | Fowle et al. | Nov. 21, 1922 |
| 1,657,214 | Kutchka | Jan. 24, 1928 |
| 2,336,510 | Spinasse | Dec. 14, 1943 |
| 2,387,886 | Devol | Oct. 30, 1945 |
| 2,505,103 | Devol | Apr. 25, 1950 |
| 2,598,893 | Drake | June 3, 1952 |